United States Patent [19]

McElligott et al.

[11] 4,087,580

[45] May 2, 1978

[54] WATER EXTENDED PLASTISOL FILM CARBON PAPER

[75] Inventors: Michael Jerry McElligott; John Lewis Williams, both of Rochester; Russell William Gauger, Jr., Henrietta, all of N.Y.

[73] Assignee: Burroughs Corporation, Detroit, Mich.

[21] Appl. No.: 671,400

[22] Filed: Mar. 29, 1976

[51] Int. Cl.$^2$ .................... B32B 3/26

[52] U.S. Cl. .................... 428/307; 427/153; 428/522; 428/914

[58] Field of Search .................... 428/304, 306, 320, 914, 428/307, 310, 522; 427/146, 153; 260/29.6; 197/172; 282/27.5

[56] References Cited

U.S. PATENT DOCUMENTS

| | | | |
|---|---|---|---|
| 2,893,890 | 7/1959 | Harvey | 428/914 X |
| 2,984,582 | 5/1961 | Newman et al. | 428/914 X |
| 2,989,493 | 6/1961 | Clark et al. | 428/514 X |
| 3,037,879 | 6/1962 | Newman et al. | 428/914 X |
| 4,028,286 | 6/1977 | Neri et al. | 260/2.5 P |

*Primary Examiner*—Thomas J. Herbert, Jr.
*Assistant Examiner*—Bruce H. Hess
*Attorney, Agent, or Firm*—Kevin R. Peterson; William B. Penn; Lynn L. Augspurger

[57] ABSTRACT

Disclosed is a film composition for carbon paper and other uses wherein dispersion grade polyvinyl chloride resin is mixed with glycerin and other water soluble plasticizers and extended with water. Substitute plasticizers are ethylene glycol, low molecular weight polyglycols including di-ethylene glycol and tri-ethylene glycol, and polyether alcohols.

5 Claims, No Drawings

WATER EXTENDED PLASTISOL FILM CARBON PAPER

This invention relates to water insoluble plastisol films (particularly polyvinyl chloride films) which are externally plasticized with organic water soluble plasticizers and extended with a hydroxyl compound, such as water, as solvent. This formulation has general application as illustrated by the uses suggested herein and in addition, and as illustrated by some of the examples herein; i.e. the polyvinyl chloride plastisol film has surprisingly useful properties when utilized in the manufacture of carbon paper. This discovery has resulted in the manufacture of carbon paper having unexpected physical characteristics and the process of manufacture has been enhanced by substantial reduction of airborne pollutants.

BACKGROUND OF THE INVENTION

The discovery was made while investigating improvements to the newly developed plastisol carbon paper, the subject of U.S. patent application Ser. No. 591,856, filed June 30, 1975, now U.S. Pat. No. 4,028,286 granted June 7, 1977, for an "Ink Transfer Member," by Joseph D. Neri and John L. Williams, and assigned to the assignee of this application, incorporated in its entirety herein. Plastisol carbon paper had been earlier developed by Kee-Lox Manufacturing Co. (Harvey, U.S. Pat. No. 2,893,890) and Burroughs Corporation, Ralph H. Clark, U.S. Pat. No. 2,989,493, issued June 20, 1961.

While the earlier plastisol suggestions were interesting, the main part of present day production of carbon paper are either hot wax or solvent carbon paper, as developed by the same Ralph H. Clark, see U.S. Pat. No. 2,944,037, issued July 5, 1960. Solvent carbons have a tendency to add pollutants to the atmosphere during manufacture and considerable difficulty has been encountered with hot wax carbon in view of the softness of the wax layer and its tendency to mark anything it comes in contact with. The improvement in the above-referenced application suggested the use of a liquid polyglycol of low vapor pressure at the fusion temperature of the polyvinyl chloride plastisol. The polyglycol has the properties of low viscosity at ambient temperature, substantial insolubility in water and an effective dispersant for colorant materials. It serves as a vehicle for the liquid ink suspended within the pores of a matrix type polyvinyl chloride plastisol. The desirable result of reduced smoke was accomplished with addition of only enough substantially non-water soluble and non-hygroscopic polyglycols to meet the air pollution and write intensity requirements. This was suggested because polyglycols are more expensive than the other oils utilized as non plasticizing oils, even though it was suggested that in the polyvinyl chloride plastisol composition the polyglycol can replace all of the oil vehicle. The plasticizers utilized were unaffected. These were typically esters such as dioctyl phthalate, dibutyl phthalate, tricresyl phosphate, triethylene glycol di-2 ethyl butyrate and others which are well known widely employed polyvinyl chloride plastisols formulations.

It was known by earlier experiments that water in small amounts was not detrimental to the fusion of the polyvinyl resin.

Even organosols, i.e. plastisols thinned with a volatile solvent were found to be substantially unaffected by the addition of small parts of water to the solvent before fusion.

Hydrosols were well known, as was the commercial practice of plasticized water soluble resins. Polyvinyl alcohol is a well known water soluble resin often plasticized with glycerine when used in vacuum bag molding. A cold water soluble type polyvinyl alcohol is also used in packaging and barrier films.

However, plasticized polyvinyl chloride and polyvinylidene chloride copolymer films have become so well known for their properties, chemical resistance, low water absorption, good tensile and tear strength that when the term plastisol is used, reference is made, as it is here, to the use of finely divided thermoplastic water insoluble vinyl based polymers, dispersed in a solution to form a relatively viscous dispersion. An organosol is a plastisol in which the solution contains an organic volatile thinner or solvent for the plasticizer such that the organosol is consequently less viscous than the plastisol but is similarly used. As the plasticizers of these water insoluble vinyl polymers were oil based, typically esters, the solvents used, as thinners were also oil based. The typical dispersants include for instance methyl ethyl ketone and acetone, which hydrocarbons of low viscosity and low solvating types are used to balance the dispersants.

SUMMARY OF THE INVENTION

The discovery that dispersion grade polyvinyl chloride resins can be plasticized with the water soluble plasticizers disclosed herein by way of example and then extended with a hydroxyl compound, particularly water and then complete fusion or gelation at acceptable temperatures has important consequences.

The cost of the resultant carbon paper or film product, when compared to products produced by current processes, is reduced. In addition, when the organic solvents used with organosols are driven off up the stacks during the fusion process the objectionable volatiles are eliminated and replaced by the highly acceptable hydroxyl substitute, preferably water. The carbon paper which is made as film from the plastisol so extended meets the tests of commercially acceptability, namely low cost, effective and clean, not dirty to the touch, film which can express the black and other like colors used for typewriter carbon. Here the resulting product is especially surprising.

The product is also suitable for a variety of additional uses, as packaging, wire and cable coatings, wall coverings, upholstery, and in general coatings where oil plasticized PVC plastisols are commercially employed.

A description of the invention, along with its presently preferred examples follows. It will be appreciated that these examples illustrate several workable examples, along with suggestions for their amplification and improvement as will occur to those practicing the act now and in the future.

DETAILED DESCRIPTION OF THE INVENTION

While the ink releasing members of the present invention are of the plastisol type in which polyvinyl chloride resins are dispersed in a liquid plasticizer which does not solvate the resin at room temperature, but which, on heating to the fusion temperature, of 140° to 210° C., will act as if the resin was solvated. Unlike the prior use of esters such as the high boiling substance, dioctyl phthalate, which is an oil derivative and is the principle commercial external plasticizer for PVC, glycerin is water soluble. In the past water soluble additives were eliminated from the dispersion, because while small amounts of water could be added, large amounts cause unsatisfactory results with PVC resins.

The mixture of commercial plastisols is typically accomplished by adding plasticizers to the resin, the plasticizer range of from 30–80% plasticizer by weight of the total weight of the plastisol.

Likewise we found these ranges acceptable for glycerin and polyether alcohols and found most suitable a 2:1 resin to plasticizer proportion mix. Additives such as stabilizer, fillers, pigments and lubricants, including oils may be incorporated.

The particular grade resin which we prefer, and which was first used is sold under the trademark Geon 121*, a well-known dispersion grade PVC homopolymer resin sold by B. F. Goodrich (*Registered Trademark of B. F. Goodrich Chemical Company), having an average particle size of two microns. The viscosity of the paste with glycerin was high at room temperature and in excess of 20,000 (CPS).

We discovered that water could be added as an extender, to thin the plastisol, much as volatile organic solvents are used to thin organosols. Distilled or tap water, when added to the paste, acts as a very effective solvent and thinning agent.

The following materials can be used in preparing the ink releasing member. It will be noted that, but for the plasticizers and extenders, the materials are in some instances identical with those disclosed in U.S. Pat. No. 2,989,493: Basic components are:

1. *Resin* — general dispersion grade polyvinylchloride resin. Some examples of such a type are:
   - Geon 121 — B. F. Goodrich Co.
   - FPC 654 — Firestone Plastics Co.
   - Tenneco 1755 — Tenneco Chemical Co.
2. *Oils* — two basic types:
   - a. Water-Soluble — The use of water-soluble plasticizing oils, i.e. glycerin, ethylene glycol, various polyether alcohols, produce very clean surface characteristics with good release properties. The water soluble plasticizer, it will be appreciated, upon reading the herein incorporated patent application Ser. No. 591,856, filed June 30, 1975, and this application in its entirety, that suitable water soluble plasticizers can be selected from the group consisting of ether alcohol and polyether alcohols, glycerin, ethylene glycol and hygroscopic low molecular weight polyglycols including, di-ethylene glycol and triethylene glycol, or mixtures thereof.

Representative sources are:
     - Glycerin — Emery Industries Glyco Chemicals Inc.
     - Triton X-100 — Rohm & Haas Co. — polyether alcohol.
   - b. Non-water Soluble Oils — general class of paraffinic, olefinic and napthenic oils. Examples being:
     - Sunpar 120 — Sun Chemical Co. — paraffinic oil
     - 991 Oil — Sun Chemical Co. — napthenic oil.
3. *Colorants* — pigments and dyes, the component which is exuded forth from the carbon paper. Representative examples are:
   - FL 14511 — Sherwin Williams — an alkali blue pigment dispersed 40% by weight in mineral oil.
   - T-6630-1764-2 — Chemtron Corp. — carbon black dispersed 33% by weight in peanut oil.
   - Typophor C — BASF Wyandotte — Nigrosine black dye dispersed 33% by weight in oleic acid.
4. *Additives*
   - a. polyglycols — use of polyglycols increases the exudation of colorants. Examples are:
     - Polyglycol P-2000 — Dow Chemical Co. — high molecular weight polyglycol.
     - Polyglycol 112-2 — Dow Chemical Co. — high molecular weight polyglycol.
   - b. Wetting agents — water soluble non-ionic surfactants:
     - Triton X-100 — Rohm & Haas Co. — polyether alcohol. Also acts as a plasticizer for polyvinylchloride.
   - c. Stabilizer — prevents degradation of the vinyl film. A representative example is:
     - Vanstay — 6172 — R. T. Vanderbilt Co. — Ba-Cd. complex.
5. *Water* — diluent, viscosity control.

| FORMULATION RANGES | Parts by Weight |
|---|---|
| Resin Component | 30–40 |
| Oils-Water Soluble | 10–30 |
| Colorants | 10–30 |
| Oils-Water Insoluble | |
| Vehicles | 0–10 |
| Additives | 10–20 |
| Water (Distilled) | 5–15 (infinite dilution) |

| MEDIUM VALUE OF FORMULATION RANGES/PER 100 WT. | |
|---|---|
| Resin Component | 35 |
| Oils-Water Soluble | 17 |
| Colorants | 20 |
| Oils-Water Insoluble | |
| Vehicles | 3 |
| Additives | 15 |
| Water (Distilled) | 10 |
| | 100 Wt.. |

| SPECIFIC EXAMPLE FORMULATONS | Parts by Weight Per Hundred Wt. |
|---|---|
| Geon 121 | 33.1 |
| Glycerin | 16.5 |
| $H_2O$ (distilled) | 12.6 |
| Polyglycol 112-2 | 4.7 |
| Vanstay 6172 | 2.4 |
| Triton X-100 | 7.1 |
| 991 Oil | 3.2 |
| T-6630-1764-2 Chemtron Paste | 15.7 |
| FL14511 | 4.7 |
| | 100.0 Wt. |
| Geon 121 | 33.1 |
| Glycerin | 16.5 |
| $H_2O$ (distilled) | 12.6 |
| Polyglycol 112-2 | 4.7 |
| Vanstay 6172 | 2.4 |
| Triton X-100 | 7.1 |
| 991-Oil | 3.2 |
| T6630-1764-2 Chemtron Paste | 15.7 |
| FL14511 | 3.9 |
| Emcol CC-42 wetting agent Witco. Chemical | .8 |
| | 100.0 Wt. |
| Geon 121 | 29.8 |
| Glycerin | 14.9 |
| $H_2O$ (distilled) | 11.4 |
| Polyglycol 112-2 | 4.2 |
| Vanstay 6172 | 2.2 |
| Triton X-100 | 6.3 |

-continued

| SPECIFIC EXAMPLE FORMULATONS | Parts by Weight Per Hundred Wt. |
|---|---|
| 991-Oil | 2.8 |
| T6630-1764-2 Chemtron Paste | 14.2 |
| FL14511 | 3.6 |
| Emcol CC-42 | 1.6 |
| DS 2493 - a dye from Dye Specialties, Inc. | 3.5 |
| Sunpar 120 | 5.5 |
| | 100.0 Wt. |

In preparing the above examples of the ink releasing member, the colorant material oils are premixed, with the addition of surfactants to make the oils miscible in water. The polyvinyl chloride resin in the form of finely divided dispersion grade particles is also premixed in a low-speed, high shear mixer, such as a planatary mixer, with the water soluble plasticizer. Then water is added to bring the mix to the desired viscosity. Subsequently the colorant is added and the two combined in the planatary mixer until the mix is homogeneous throughout.

After mixing, if the composition is to be used in preparing an ink transfer member, such as "carbon paper," the composition is coated on a film or other support surface using any suitable coating apparatus. A reverse roll coater or a trailing blade coating apparatus is suitable for coating the composition. The composition is fused after coating by heating it to a temperature sufficiently high for the resin particles to fuse, as by passing the coated substrate over a roll heated to a temperature of about 175° C to 205° C or by use of infrared heat lamps. During the fusion process very little pollutants, such as fumes or smoke, are emitted. The temperature and length of time for the fusion process can be controlled to further reduce the small amount of airborne pollutants remaining.

If the ink transfer member is to remain coated, it may be slit and packaged. However, the composition is suitable for stripping from the support substrate, as for instance described in U.S. Pat. No. 3,392,042 issued July 9, 1968, incorporated by reference. It can be originally coated on a substrate which is release coated, and essentially stripped therefrom after fusion.

Along with the reduction of air pollution, a surprising quality of the carbon is the lack of surface "dirtiness." When touched the surface does not leave smudges and as such the product will be highly acceptable to the particular user, the typist.

We believe for cost reasons and effectiveness that glycerin is the best plasticizer in this formulation and water is the best extender. However, we are experimenting with various substitutes. These additions and substitutions will continue to become apparent to those skilled in the art without departing from our invention, after reading this disclosure of suggested examples now and in the future.

What is claimed is:

1. In an ink releasing member of the plastisol type having a matrix in which a liquid ink is suspended within the pores thereof and expressed therefrom upon impact of a pressure producing device, the improvement wherein a plastisol is formed of dispersion grade polyvinyl chloride mixed with water soluble plasticizer before fusion, the said water soluble plasticizer being selected from a group consisting of ether alcohol and polyether alcohols and glycerin, or mixtures thereof.

2. An ink releasing member of the type set forth in claim 1 wherein the plastisol is extended with a hydroxyl compound.

3. An ink releasing member of the type set forth in claim 2 wherein the hydroxyl compound is $H_2O$.

4. An ink releasing member of the type set forth in claim 1 wherein the plasticizer is a polyether alcohol.

5. An ink releasing member of the type set forth in claim 1 wherein the plasticizer is glycerin.

* * * * *